April 4, 1967 T. L. LAUR 3,312,574
PROCESS FOR MAKING STABLE SILICONE RUBBER INTERLAYERS FOR GLASS
Filed July 13, 1964
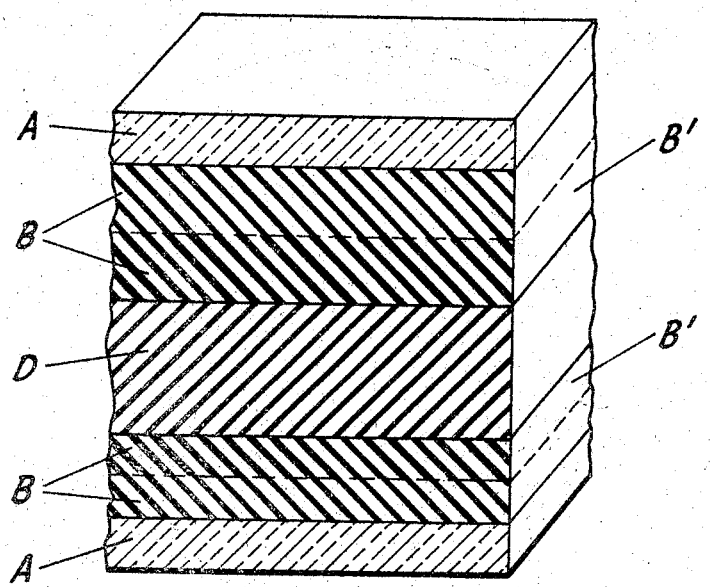
INVENTOR.
THOMAS L. LAUR
BY Robert F. Fleming Jr.
AGENT

United States Patent Office 3,312,574
Patented Apr. 4, 1967

3,312,574
PROCESS FOR MAKING STABLE SILICONE
RUBBER INTERLAYERS FOR GLASS
Thomas L. Laur, Sanford, Mich., assignor to Dow Corning Corporation, Midland, Mich., a corporation of Michigan
Filed July 13, 1964, Ser. No. 382,084
5 Claims. (Cl. 156—106)

This application relates to new, transparent interlayers for safety glass that possess excellent heat stability.

Silicone rubber-glass interlayers are well known and are in commercial use. Their compositions are disclosed in U.S. Patents 3,036,985 and 3,094,446, which patents are made a part of this disclosure.

These transparent silicone rubber interlayers are sandwiched between two sheets of glass to prevent the glass from shattering in event of breakage. An adhesive agent such as ethylpolysilicate is generally added to the silicone interlayer to promote adhesion between the silicone and the glass.

The advantage of silicone interlayers is that they will stand temperatures far above the temperature that purely organic interlayers, such as those used for automobile safety glass, will stand. Silicone interlayers have special value in the windows of supersonic aircraft, which must resist high temperatures.

It has been found, however, that the adhesive agent which causes the silicone interlayer to firmly adhere to the glass often reduces the temperature stability of the silicone.

It has also been found that if the interlayer which contains the adhesive agent is cured and postcured by heating under conditions where the volatile fractions of the cured interlayer can escape, the problems of heat decomposition of the interlayer after installation in the final product will be greatly reduced. The results will be superior to the results obtained from the process of U.S. application Ser. No. 368,089, filed May 18, 1964, which discloses another way of stabilizing silicone interlayer compositions which contain certain adhesive agents.

This application relates to the method of forming a composite article consisting essentially of (1) laminating to (A) transparent, siliceous, nonelastomeric solid sheets, a layer (B) consisting essentially of a layer of transparent, uncured silicone elastomer stock in contact with (A) containing from 0.5 to 10 weight percent, based on the weight of the elastomer stock, of an adhesive agent, and a layer of from 0 to 150 mils of a transparent, uncured silicone elastomer stock containing no adhesive agent, (2) covering (B) with (C) a flexible inert sheet which will not strongly adhere to (B), (3) vulcanizing the silicone elastomer stock under pressure, (4) removing (C) from (B), (5) further heating the silicone elastomer to drive off substantially all volatile materials; (6) laminating to (B) a layer of (D) transparent, uncured silicone elastomer stock containing substantially no adhesive agent; (7) assembling the laminates so that the resulting structure is composed of alternate layers in the order (A), (B), (D), (B), (A); and (8) thereafter heating the assembly under pressure to vulcanize the uncured silicone elastomer stock.

The drawing shows a cross-section of a laminate of this invention. The layers marked A are made of the transparent, siliceous non-elastomeric solid; the layers marked B are made of the silicone rubber that contained an adhesive agent plus the optional adhesive-free (B') layer which, when present, contacts layer D, which is silicone rubber containing substantially no adhesive agent.

The process of this invention can be used to make laminates that contain inner layers of transparent, non-elastomeric solid, but each of such layers must be separated by layers (B) and (D) as described above.

The transparent, non-elastomeric solid is most commonly glass, but it can be any transparent, siliceous, non-elastomeric solid; e.g. fused quartz. One side of the laminate can be one kind of transparent solid and the other side another. For example, a laminate with glass on one side and fused silica on the other can be made.

There are many well-known transparent, heat-curable silicone elastomer stocks. Most silicone elastomers would be transparent, if they had the proper filler. Methods of making these compositions are found in the above-cited patents.

The adhesive agent used in this invention can be any material that increases the adhesion of the silicone rubber interlayer to the transparent, siliceous, non-elastomeric solid. Useful adhesive agents are the lower alkyl orthosilicates and polysilicates, and methylhydrogen polysiloxane.

Any lower alkyl orthosilicate or polysilicate is useful in the composition of this invention. Examples are methyl orthosilicate, ethyl orthosilicate, hexyl orthosilicate, methyl polysilicate, ethyl polysilicate, and isopropyl polysilicate.

Methylhydrogenpolysiloxane is any polymeric material that consists essentially of

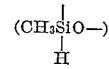

units. Small numbers (i.e. not over 30 mol percent) of other units such as endblocking groups (e.g. $(CH_3)_3SiO-$,

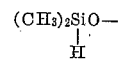

etc.) or chain-branching groups

can also be present in the polymer molecule.

During curing, the adhesive agents of this invention are believed to give off volatile materials through reaction with the silicone elastomer. This volatile material can be hydrogen in the case of a methylhydrogensiloxane adhesive agent which can form bubbles, or it can be an alcohol in the case of a lower alkyl orthosilicate or polysilicate. The alcohol is believed to migrate throughout the interlayer and upon heating, to degrade the interlayer by breaking the long polymer chains.

It is believed that when the interlayer material is cured and postcured by heating before being assembled into the laminated interlayer of this invention, the harmful volatiles which have been formed are given a better opportunity to diffuse away, which explains the improved stability of interlayers made by the process of this invention.

An adhesive agent is not needed to bond the cured interlayer to the middle section (D) of uncured interlayer, as long as "air inhibition" has been avoided, which is the phenomenon of an interlayer surface losing its bonding and vulcanizing ability if it is cured in contact with the air. It is for this reason that the process of this invention uses the flexible, inert sheet (C) to cover interlayer (B) during the vulcanization process. If desired, however, postcure heating can be done in the air.

The flexible, inert sheet (C) must obviously neither melt nor substantially soften at the vulcanizing temperature. The word "inert" is used to specify this characteristic, along with chemical inertness, in the claims. The preferred material for sheet (C) is polytetrafluoroethylene. Other suitable materials are styreneacrylonitrile copolymers, polymethylmethacrylate, polypropylene, polyisoprene, etc.

It is preferred to heat the interlayer after cure in step 5 of the process of this invention for at least 12 hours and at least 290° F. Benefit will be obtained, however, by a heating of at least 250° F. and for at least eight hours.

The heating which is sufficient to vulcanize the interlayer in step 3 depends on the curing system, and is well-known to the art. At least 40 p.s.i. of pressure on the laminate is desirable during step 3 to assure a firm bond between (A) and (B), but lower pressures are operative.

There is no minimum thickness for the various sheets of interlayer material with regard to operativeness in the invention, but there are practical difficulties of calendering a sheet of elastomer stock that is thinner than 10 mils, which is, therefore, the practical minimum limit for the thickness of (B) and (D). The maximum thickness is limited only by optical factors, which begin to be significant at about 400 mils. Therefore, the preferred thickness of the total interlayer is between 30 and 400 mils.

The amount of heating required in step 8 varies according to the thickness of the laminate and the method of vulcanizing. Generally, a suitable time is 5 minutes, a suitable temperature is 290° F., and a suitable pressure is 40 p.s.i. though lower pressures are operative. It is desirable to further heat the laminate as a postcure operation, e.g. for 12 hours at 290° C.

The following examples are illustrative only and should not be construed as limiting the invention which is properly delineated in the appended claims.

EXAMPLE 1

The following elastomer stock was milled until homogeneous: 100 parts by weight of a dimethylpolysiloxane containing a small amount of vinyl and phenyl substituents and having a Williams plasticity of about 50, 30 parts of a cohydrogel containing $CH_3SiO_{3/2}$ and $SiO_{4/2}$ groups, 0.2 part of dicumyl peroxide, and 3 parts of ethyl polysilicate.

The transparent composition was calendered between polyethylene sheets, and portions of this were transferred from the polyethylene sheets to two 12" square glass panes, the calendered elastomer stock thickness being 0.015 inch (15 mils).

A similar elastomer stock was made that contained no ethylpolysilicate. This was calendered between two polyethylene sheets, and then transferred from the polyethylene sheets to the top of the elastomer stock already on both of the glass panes, a thickness of 0.040 inch (40 mils) being applied to each.

The two laminates were then brought together on their elastomer sides with a sheet of polytetrafluoroethylene placed between them. This was vulcanized in an oil autoclave for 30 minutes at 300° F. at 200 p.s.i.

The two laminates were then separated, the polytetrafluoroethylene sheet removed, and the laminates heated in the air for 24 hours at 300° F., and then for 2 hours at 400° F.

Another sheet of identical elastomer stock without ethylpolysilicate was placed on the vulcanized elastomer of one of the laminates, the sheet being 0.04 inch (40 mils) thick. The other laminate was placed thereon, the elastomer side in contact.

This new laminate was vulcanized in the same manner as above, and postcure heated for 24 hours at 300° F.

A transparent laminate with glass outer layers and an inner layer of elastomer 0.15 inch (150 mils) thick was the product.

This laminate (laminate A) was compared with similar laminates: laminate B contained the same formulation of elastomer where all the elastomer was of the ethylpolysilicate formulation, shown above. Laminate C had the same formulation of elastomer, and was prepared by the method of Example 1 in application Ser. No. 368,089, filed May 18, 1964.

These laminates were aged at 400° F., the number of hours until visual failure being recorded.

| | Hours until failure |
|---|---|
| Laminate A | Over 50 |
| Laminate B | 4–5 |
| Laminate C | 32 |

EXAMPLE 2

When the laminate of Example 1 is made, the ethyl polysilicate ingredient being replaced by an equal weight of methylhydrogen polysiloxane, an optically clear laminate of good heat-stability is formed.

EXAMPLE 3

Equivalent results are obtained when the experiment of Example 1 is repeated, using methylorthosilicate instead of ethylpolysilicate.

That which is claimed is:

1. The method of forming a composite article consisting essentially of
   (1) laminating to
      (A) transparent, siliceous, non-elastomeric solid sheets, a layer
      (B) consisting essentially of a layer of transparent, uncured silicone elastomer stock in contact with (A) containing from 0.5 to 10 weight percent, based on the weight of the elastomer stock, of an adhesive agent from the group consisting of lower alkyl orthosilicates, polysilicates and methylhydrogen polysiloxane, and a layer of from 0 to 150 mils of a transparent, uncured silicone elastomer stock containing no adhesive agent;
   (2) covering (B) with
      (C) a flexible, inert, sheet which will not strongly adhere to (B);
   (3) vulcanizing the silicone elastomer stock under pressure;
   (4) removing (C) from (B);
   (5) further heating the silicone elastomer to drive off substantially all volatile materials;
   (6) laminating to (B) a layer of
      (D) transparent, uncured silicone elastomer stock containing substantially no adhesive agent;
   (7) assembling the laminates so that the resulting structure is composed of alternate layers in the order (A), (B), (D), (B), (A); and
   (8) thereafter heating the assembly under pressure to vulcanize the uncured silicone elastomer stock.

2. The method of claim 1 where the adhesive agent is ethyl polysilicate.

3. The process of claim 1 where the transparent uncured silicone elastomer stock used is a heat hardenable composition of matter consisting essentially of
   (1) an organopolysiloxane in which at least 50 mol percent of the polymer units are dimethylsiloxane units, any remaining polymer units being of the formula $R'_n SiO_{4-n/2}$ in which $R'$ is a monovalent hydrocarbon radical having less than 10 carbon atoms and $n$ has an average value from 1.9 to 2.1 inclusive,
   (2) a filler having a pore volume of at least 3 cc. per g. which is composed of a copolymer of
      (A) from 1 to 50 mol percent $RSiO_{3/2}$ units in which R is an aliphatic hydrocarbon radical of less than 5 carbon atoms,
      (B) from 4 to 30 mol percent $(CH_3)_n SiO_{4-n/2}$ units in which $n$ is an integer from 2 to 3 inclusive, and
      (C) from 46 to 95 mol percent $SiO_2$ units and
   (3) a vulcanizing agent.

4. The process of claim 1 where the transparent, uncured silicone elastomer stock used is a heat hardenable composition of matter consisting essentially of
   (1) an organopolysiloxane in which at least 50 mol percent of the polymer units are dimethylsiloxane units, any remaining polymer units being of the formula $R'_2SiO$ in which $R'$ is selected from the group consisting of methyl, phenyl and vinyl radicals, (2) a filler having a pore volume of at least 3 cc. per g. which is composed of a copolymer of from 1 to 50 mol percent $CH_3SiO_{3/2}$ units, from 4 to 30 mol percent $(CH_3)_3SiO_{.5}$ units and from 46 to 95 mol percent $SiO_2$ units, and (3) a vulcanizing agent.

5. The process of claim 1 where (A) is glass.

References Cited by the Examiner

UNITED STATES PATENTS

| | | | |
|---|---|---|---|
| 2,557,778 | 6/1951 | Barry | 161—193 |
| 2,860,083 | 11/1958 | Nitzsche et al. | 161—193 |
| 3,261,739 | 7/1966 | Porter | 161—193 |

ALEXANDER WYMAN, *Primary Examiner.*

W. J. VANBALEN, *Assistant Examiner.*